United States Patent [19]
Telech

[11] 3,797,156
[45] Mar. 19, 1974

[54] FLYING FISH GAFF

[75] Inventor: Michael Telech, Beaufort, S.C.

[73] Assignee: James H. Moss, Beaufort, S.C.; a part interest

[22] Filed: June 9, 1972

[21] Appl. No.: 261,359

[52] U.S. Cl. .................. 43/5, 43/18 R, 294/26
[51] Int. Cl. ............................... A01k 97/14
[58] Field of Search .............. 43/5, 18 R; 294/26

[56] References Cited
UNITED STATES PATENTS

| 1,302,457 | 4/1919 | Ureck | 43/5 |
| 2,677,911 | 5/1954 | Fink | 43/5 |
| 1,231,150 | 6/1917 | Gere | 43/18 R |
| 3,325,938 | 6/1967 | Minera | 43/18 R |

FOREIGN PATENTS OR APPLICATIONS

| 25,334 | 0/1905 | Great Britain | 43/5 |

Primary Examiner—Louis G. Mancene
Assistant Examiner—Daniel J. Leach
Attorney, Agent, or Firm—Wellington M. Manning, Jr.

[57] ABSTRACT

An improved flying fish gaff comprising an elongated, hand held rod with a tip removably secured to one end thereof. Hook means is pivotally secured to the tip and is normally disposed parallel to the tip where a barbed point is exposed for implanting same in a fish body. A flexible retrieval means is secured at one end to the tip and at an opposite end to a reel means mounted on the rod. Once a fish is impaled on the hook means, the hook means pivots around the tip and extends therefrom; the tip is pulled from the rod and the retrieval means plays out from the reel means. Thereafter the fish may be landed by proper manipulation of the reel means.

10 Claims, 4 Drawing Figures

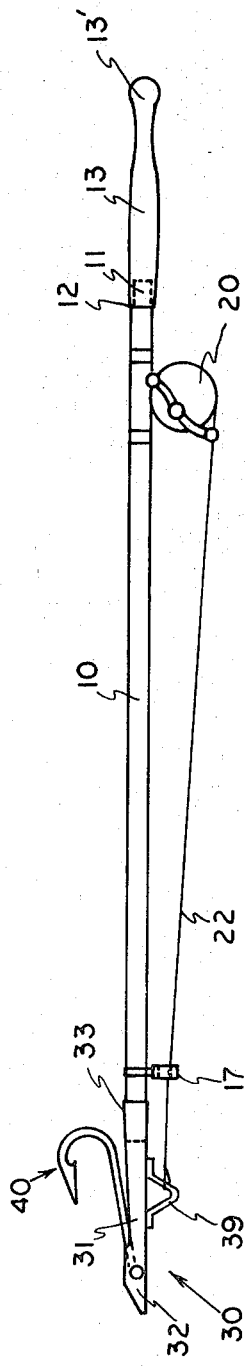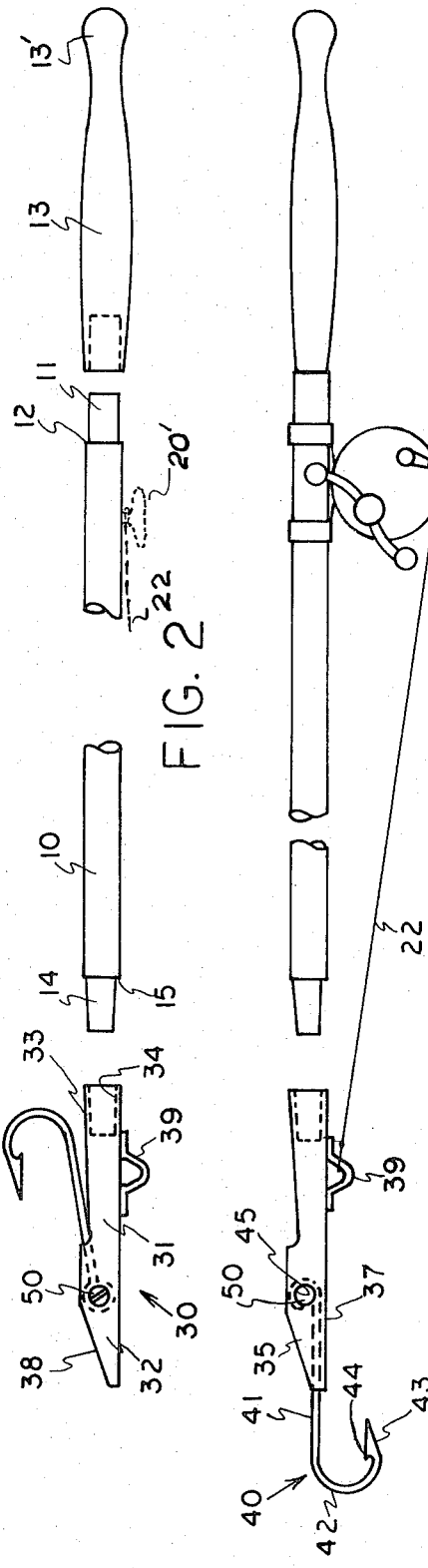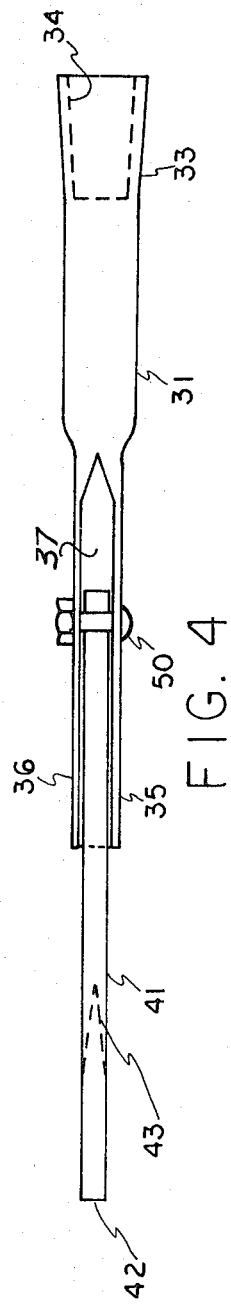

FLYING FISH GAFF

BACKGROUND OF THE INVENTION

Numerous means have heretofore been devised for impaling a fish to land same once the fish has been hooked by a fisherman and reeled in to the edge of a boat or dock. Such devices include a conventional fish gaff which is made up of a handle having a rigidly secured hook means at a forward end thereof. With the normal gaff, the fisherman reaches over the side of the boat or dock and impales the fish on the hook means. Thereafter, the fish is physically lifted from the water onto the dock or into the boat. Additional gaff means have also included a conventional harpoon that is thrown or discharged from a gun for same having a rope or the like secured to the rear end thereof for retrieval purposes. The harpoon passes into the fish after which the fish and harpoon may be retrieved by physically pulling in the rope.

A further type fish gaff embodies a removable gaff from a rod or the like having a line secured thereto. Once the fish is impaled on the gaff, the gaff is pulled from the end of the rod and is held by the line. The line may be independently fastened to a winch or other retrieval means or pulled in by hand.

Prior art devices are fraught with problems and disadvantages. Primarily, many fish are lost due to the necessary awkward manipulation of the prior art devices. For example, with a normal gaff, an arcuate swinging motion is required for gaffing the fish, thus increasing the time and decreasing the probability of successful implantation of the gaff in the moving fish. Likewise, a harpoon, though following a direct line to the object, often finds the trailing rope tangled which diverts the harpoon from its intended course or causes same to fall short of the target.

The present invention represents an improvement over known prior art devices. Use of the instant gaff involves a straight line shot at the fish without the danger of line entanglement. Further, the pivotal movement of the hook means aids in proper impalement of the fish which minimizes the chance of losing same. In fact, the gaff of the present invention has proved almost infallible in landing fish.

The patented prior art does not teach or suggest applicant's novel flying fish gaff. Exemplary of the prior art are U. S. Pat. Nos. 2,677,911 to Fink; 2,759,758 to Yancey and 3,006,678 to Johnson.

SUMMARY OF THE INVENTION

It is an object of the present invention to provide an improved flying fish gaff.

Another object of the present invention is to provide an improved gaff for the retrieval of fish once the fish are hooked by a fisherman.

Another object of the present invention is to provide a novel pivotal gaff means for impaling fish and for successfully landing same from a body of water.

Generally speaking, the present invention relates to a flying fish gaff comprising an elongated rod; a tip removably secured to said rod at one end thereof; hook means pivotally secured to said tip means on said tip to limit pivotal movement of said hook means; flexible retrieval means secured to said tip; and means secured to said rod for manipulation of said retrieval means.

More specifically, the present invention is directed to a hand held, flying fish gaff where a tip, removably secured to an outer end of an elongated rod has a large barbed hook pivotally secured thereto. The barbed end of the hook normally resides approximately parallel to the tip and faces in the same direction of the tip. The barbed hook may thus be driven into the fish in a direct line much like a spear or harpoon. Once the fish is impaled on the hook, and the fish attempts to swim away, the hook portion of the gaff pivots around its pivot point on the tip and more securely implants the hook within the body of the fish. Continual withdrawal by the fish will thereafter pull the tip and hook means off the elongated rod and a flexible line or other retrieval means secured to the tip will be played out from the rod or from a reel on the rod as the fish swims away. Once the fish tires, the line or retrieval means may be pulled in, rewound onto a reel secured to the rod or the like to return the fish to the boat or dock whereby the fish may be removed from the water.

The device of the present invention is completely hand held to facilitate mobility, portability and useability. In other words, the rod and reel combination may assume the identity of the normal casting rod where the reel is removably secured thereto by a pair of sliding sleeves over a bracket on the reel. Moreover, the rod may comprise a removable rear section having a rounded end for placement against the body of one using the device. A forward outer end of the rod has a reduced diameter section and a shoulder. The removable tip telescopes over the reduced diameter section of the rod and abuts against the shoulder with the hook means in a collapsed position such that the barbed point of the hook faces in the same general direction as the rod. In such a fashion the rod may be directed against the fish in a direct manner and the fish impaled upon the barbed section of the hook. Thereafter the hook pivots around its pivot means until the shank of the hook extends axially beyond the end of the tip with the curved and barbed sections of the hook residing beyond the end of the tip. At such point the tip is pulled from the end of the rod and should the fish attempt to swim away, a line secured to the underside of the tip will play out from the reel until the fish tires. The line can then be reeled in, bringing the tip and fish therealong for landing.

The pivotal movement of the hook means is produced by movement of the impaled fish, attempting to swim out of the area. In this regard, the forward end of the tip is provided with an elongated channel section in which the hook means is pivotally secured. As the hook pivots around the pivot point to extend axially beyond the tip, the shank of the hook means abuts the bottom of the channel section and further pivotal movement is precluded.

The forward end of the removable tip is beveled along the channel section in a rearward direction. Hence, should one strike the fish with the tip instead of the hook means, the tip will be cammed away along the bevel, causing the hook means to engage the fish. Likewise, the middle and rear sections of the tip may be reduced in size to better expose the hook means, again improving the chance of successful implantation of the hook means into the fish.

BRIEF DESCRIPTION OF THE DRAWINGS

FIG. 1 is a side view of the improved fish gaff according to the teachings of the present invention.

FIG. 2 is an exploded side view of certain of the components of the flying fish gaff according to the teachings of the present invention.

FIG. 3 is a partial exploded further view of the device according to the present invention showing the hook means in the extended position for removal of the tip from the rod.

FIG. 4 is an enlarged top view of the removable tip of the fish gaff according to the present invention.

DESCRIPTION OF THE PREFERRED EMBODIMENTS

Referring to the Figures, the flying fish gaff of the present invention will be described in detail. In FIGS. 1, 2 and 3 there is shown a rod 10 having a reel means 20 secured thereto by conventional means and a tip 30 generally indicated as 30 removably secured to an end thereof. Tip 30 has a flexible retrieval member 22 secured thereto, with an opposite end of member 22 being secured to reel 20.

Rod 10 has a reduced diameter section 11 and shoulder 12 at a rear end thereof and a reduced diameter section 14 and shoulder 15 at a forward end thereof. A removable handle 13 is provided at the rear end of rod 10 and telescopes over reduced diameter section 11, abutting shoulder 12. Handle 13 further has an enlarged rounded end 13' that may rest against the body of one using the gaff for comfort and to better maintain control over rod 10 and reel 20 during landing of a fish. Rod 10 further may be provided with one or more eyelets 17 through which retrieval member 22 may pass for guiding same and for relieving some of the force that otherwise would be applied to reel 22 during landing of a fish.

Removable tip 30 is made up of a body having a mid section 31, a front channel section 32 and a rear connector section 33. Connector section 33 has a socket 34 formed axially therein which telescopes over reduced diameter section 14 of rod 10, abutting shoulder 15 to removably secure tip 30 to rod 10. Channel section 32 is made up of side walls 35 and 36 and a bottom wall 37. A hook means 40 partially resides within the channel defined by side walls 35 and 36 and is pivotally secured thereat by a pin 50 or the like.

Hook means 40 comprises a shank 41, a curved end 42 and a point 43 having a barb 44 thereon. Shank 41 of hook means 40 further has an eye 45 at an end thereof opposite curved end 42. Shank 41 thus resides between side walls 35 and 36 of channel section 32 where pin 50 passes through walls 35 and 36 and eye 45 to pivotally secure hook means 40 to tip 30. Normally hook means 40 resides within channel section 32 as shown in FIGS. 1 and 2 with shank 41 passing rearwardly out of channel section 32 resting atop mid section 31. Curved section 42 of hook 40 turns upwardly and towards the outer end of tip 30, thus presenting barbed point 43 for use. In this regard, note that the entire length of shank 41 does not reside between channel walls 35 and 36. Instead channel 32 extends for only a short distance along shank 41 to a point where a shank 41 engages mid section 31 which holds hook means 40 out at a proper angle to better expose same for contact with the fish.

Side walls 35 and 36 of channel section 32 of tip 30 are preferably constructed to improve the chances of gaffing a fish with the present device. As mentioned above, mid section 31 biases hook means 40 outwardly to better dispose the barbed point 43 for contact with a fish. Further side walls 35 and 36 have a beveled front edge 38 which guides tip 30 across the fish body in the direction of hook means 40. Hence with hook means 40 properly disposed, should one strike the fish with tip 30, tip 30 will glide across the fish body along beveled edges 38, thus bringing hook means 40 into contact with the fish. Both of these features individually add to the effectiveness of the present invention as does the combination thereof.

One using the device of the present invention would thus hold rod 10 in much the manner of a harpoon and with a forward thrust would stick the hook means 40 in a fish body. In the event that the forward end of the tip 30 engages the fish instead of hook means 40, beveled edge 38 of walls 35 and 36 will guide hook means 40 into the fish body. After the fish has been impaled on hook means 40, and the fish attempts to swim away, hook means 40 pivots around pin 50 and between walls 35 and 36 to the position shown in FIGS. 3 and 4 where shank 41 of hook means 40 extends axially beyond tip 30 with the curved section 42 and point 43 also residing beyond the end of tip 30. During the pivotal movement, wall 37 of tip 30 is contacted to thwart additional pivotal movement of hook means 40 at which time the forces applied against the tip 30 become axial and remove tip 30 from small diameter section 14 of rod 10. As the fish continues to move away, retrieval means 22 which preferably is a cord of suitable size and strength for the fish being gaffed, plays out from reel 20. Thereafter, manipulation of reel 20 permits further play out or wind up of retrieval means 22 so as to land the fish.

As shown in phantom in FIG. 2, rod means 10 may also have secured thereto a bracket 20' or the like which may be used in lieu of a reel 20 to secure flexible member 22 to rod 10. Such an arrangement will involve a pull in of line 22 by hand. Likewise, tip 30 having hook means 40 pivotally secured thereto may be rigidly secured to rod 10 by screws or the like.

Having described the present invention in detail, it is obvious that one skilled in the art will be able to make variations and modifications thereto without departing from the scope of the invention. Accordingly, the scope of the present invention should be determined only by the claims appended hereto.

What is claimed is:

1. A flying fish gaff comprising:
   a. a rod;
   b. a tip removably received on one end of said rod;
   c. hook means pivotally secured to said tip adjacent a forward end thereof, said hook means having a barbed hook pointing in the direction of said forward end of said tip and being pivotal around said tip to extend axially therebeyond;
   d. means on said tip to limit pivotal movement of said hook means;
   e. a flexible retrieval means secured to said tip; and
   f. reel means for retrieving said tip.

2. A flying fish gaff as defined in claim 1 wherein said tip comprises a channel section, a mid section and a connector section, said channel section comprising two side walls and a bottom wall and wherein said hook means is pivotally secured to said tip between said side walls of said channel section.

3. A flying fish gaff as defined in claim 2 wherein said mid section of said tip biases said hook means away from said tip to properly dispose same for use.

4. A flying fish gaff as defined in claim 3 wherein said side walls of said channel section of said tip are beveled away from an outer end of said tip.

5. A flying fish gaff as defined in claim 2 wherein said connector section is provided with a socket in the end thereof, said socket residing around a portion of said rod to removably secure said tip thereto.

6. A flying fish gaff as defined in claim 4 wherein said tip has an eye secured to an underside thereof, said retrieval means being secured to said tip at said eye.

7. A flying fish gaff comprising:
 a. an elongated rod, said rod having a reduced diameter section at an outer end thereof;
 b. a tip removably secured to said rod, said tip comprising a channel section, a mid section and a connector section, said connector section having a socket, said socket being receivable around said small diameter section of said rod;
 c. hook means received within said channel section of said tip and being pivotally secured therein, said hook means extending rearwardly outwardly from said channel section, away from said tip, and being pivotal around said section to extend axially beyond said tip;
 d. flexible retrieval means secured to said tip and said rod; and
 e. means on said rod for securing said retrieval means thereto.

8. A flying fish gaff as defined in claim 7 wherein said hook means comprises a shank, a curved section and a barbed point.

9. A flying fish gaff as defined in claim 8 wherein said retrieval means is a cord and said manipulation means on said rod is a hand operated reel.

10. A fish gaff tip comprising:
 a. a body, said body comprising a front section, a mid section and a rear section;
 b. hook means pivotally secured to said front section, said hook means comprising a shank and a curved portion, said curved portion having a barbed tip at an outer end thereof, said hook means normally extending rearwardly of said front section and being biased outwardly by said mid section to present said barbed tip for use, said hook means being pivotal forward an amount limited by said front section; and
 c. means secured to said body for retrieval line engagement.

* * * * *